(12) United States Patent
Miller et al.

(10) Patent No.: US 12,497,698 B2
(45) Date of Patent: Dec. 16, 2025

(54) COATINGS FORMED FROM THE DEPOSITION OF PLASMA-ACTIVATED ADDUCTS

(71) Applicants: Southwest Research Institute, San Antonio, TX (US); Shell Oil Company, Houston, TX (US)

(72) Inventors: Michael A. Miller, San Antonio, TX (US); Ronghua Wei, San Antonio, TX (US); Gregory J. Hatton, Houston, TX (US)

(73) Assignees: SOUTHWEST RESEARCH INSTITUTE, San Antonio, TX (US); SHELL OIL COMPANY, Houston, TX (US)

( * ) Notice: Subject to any disclaimer, the term of this patent is extended or adjusted under 35 U.S.C. 154(b) by 837 days.

(21) Appl. No.: 15/148,669

(22) Filed: May 6, 2016

(65) Prior Publication Data

US 2017/0321326 A1  Nov. 9, 2017

(51) Int. Cl.

| C23C 16/503 | (2006.01) |
|---|---|
| C08G 77/24 | (2006.01) |
| C09D 183/08 | (2006.01) |
| C23C 16/30 | (2006.01) |
| C23C 16/452 | (2006.01) |
| C23C 16/455 | (2006.01) |
| C23C 16/515 | (2006.01) |

(52) U.S. Cl.
CPC .......... *C23C 16/503* (2013.01); *C09D 183/08* (2013.01); *C23C 16/30* (2013.01); *C23C 16/452* (2013.01); *C23C 16/455* (2013.01); *C23C 16/45512* (2013.01); *C23C 16/515* (2013.01); *C08G 77/24* (2013.01)

(58) Field of Classification Search
CPC ............................. C23C 16/503; C23C 16/455
USPC ............................ 427/248.1–255.7, 569–579
See application file for complete search history.

(56) References Cited

U.S. PATENT DOCUMENTS

| 6,887,578 B2 | 5/2005 | Gleason et al. |
|---|---|---|
| 8,029,875 B2 | 10/2011 | Wei et al. |
| 8,753,725 B2 | 6/2014 | Wei et al. |
| 9,121,540 B2 | 9/2015 | Miller et al. |
| 9,701,869 B2 | 7/2017 | Miller et al. |

(Continued)

OTHER PUBLICATIONS

STIC Search Report (Year: 2021).*

(Continued)

*Primary Examiner* — Michael G Miller
(74) *Attorney, Agent, or Firm* — Grossman, Tucker, Perreault & Pfleger, PLLC

(57) ABSTRACT

A fluoro-organosiloxane composition, coating and process for depositing the coating. Substituted tetramethylenedisiloxane precursor at a flow rate ($Q_{sTMDSO}$) and perfluorinated propylene oxide precursor at a flow rate ($Q_{PFPO}$) are introduced into a process chamber at a flow rate ratio ($Q_{sTMDSO}/Q_{PFPO}$) in the range of 0.1 to 2.0 (g/(hr·sccm)). A pulsed DC voltage is applied to a substrate and a fluoro-organosiloxane coating is deposited on the substrate, wherein the coating exhibits a water contact angle in oil (WCA/O) of greater than 155°.

8 Claims, 7 Drawing Sheets

(56) References Cited

U.S. PATENT DOCUMENTS

| | | |
|---|---|---|
| 9,926,467 B2 | 3/2018 | Miller et al. |
| 2008/0292806 A1 | 11/2008 | Wei et al. |
| 2010/0197526 A1 | 8/2010 | Zhang |
| 2012/0148762 A1 | 6/2012 | Wei et al. |
| 2012/0231177 A1 | 9/2012 | Wei et al. |
| 2014/0137976 A1* | 5/2014 | Miller .................... E21B 17/00 138/145 |
| 2014/0141179 A1 | 5/2014 | Palos et al. |
| 2015/0299561 A1 | 10/2015 | Monroe et al. |
| 2015/0337170 A1 | 11/2015 | Miller et al. |
| 2017/0306182 A1 | 10/2017 | Miller et al. |

OTHER PUBLICATIONS

Anders ("Physics of arcing, and implications to sputter deposition", Proceedings of the 5th ICCG, Saarbruecken, 2004) (Year: 2004).*

Anders, A.; "From Plasma Immersion Ion Implantation to Deposition: A Historical Perspective on Principles and Trends"; Surface and Coatings Technology 156, 2002, pp. 3-12.

Basner, R., et al., "Absolute Total and Partial Electron Impact Ionization Cross Sections of Hexamethyldisiloxane"; International Journal of Mass Spectrometry, 176, 1998, pp. 245-252.

Becke, A.D.; A New Mixing of Hartree-Fock and Local Density-Functional Theories; The Journal of Chemical Physics 98, 1993, pp. 1372-1377.

Becke, A.D.; "Density-Functional Exchange-Energy Approximation with Correct Asymptotic Behavior"; Physical Review, vol. A38, 1988, pp. 3098-3100.

Lee, C.; et al; "Development of the Colle-Salvetti Correlation-Energy Formula Into a Functional of the Electron Density", Physical Review, 1988, B37, No. 2, pp. 785-789.

Walter, K.C., et al.; "Adherent Diamond-Like Carbon Coatings on Metals via Plasma Source Ion Implantation", Surface Coat. Technol., 93, 1997, pp. 287-291.

Zou, M., et al; "Effects of Surface Roughness and Energy on Ice Adhesion Strength", Applied Surface Science, vol. 257, 2011, pp. 3786-3792.

International Search Report & Written Opinion issued in related PCT/US2017/031290; date of mailing Jul. 20, 2017; 6 pgs.

Office Action from related Malaysian Appln. No. PI 2018704128, dated Apr. 22, 2021.

* cited by examiner

COATINGS FORMED FROM THE DEPOSITION OF PLASMA-ACTIVATED ADDUCTS

FIELD OF INVENTION

The present disclosure is directed to fluoro-organosiloxane compositions and coatings formed from the deposition of plasma-activated adducts and, in particular, to the formation of compositions and coatings from organosiloxane and fluorocarbon precursors.

BACKGROUND

Hydrates and, in particular, clathrate hydrates are understood to be crystalline water-based solids physically resembling ice, in which methane and other relatively small hydrocarbons are trapped. Methane hydrate deposits found on and beneath the ocean floor and in certain regions of permafrost constitute the majority of known natural gas reserves on the planet. Hydrates of methane and other relatively small hydrocarbons also form in producing petroleum wells and gas or oil pipelines. However, hydrate formation within producing wells and pipelines lead to solid plugs of ice with gas trapped within that occlude product flow when unmitigated.

A portion of production costs may be invested in the prevention of hydrate formation using technologies based on chemical additives (e.g., methanol, siloxane oligomers, poly-N-vinylpyrrolidone, and aluminum sulfate) and physical methods (e.g., high-frequency electromagnetic fields). However, when such preventative methods fail, the removal of a continuous hydrate plug, for example, in an offshore pipeline is costly. Mitigation strategies that are not reliant on chemical additives or external physical methods may offer cost savings to pipeline operations if an intrinsic property of the surfaces which contact petroleum, and therefore such hydrates, can be manipulated to reduce or eliminate the nucleation and/or adhesion of hydrates on such surfaces.

Providing organosilicon functionalization and coatings, which are understood to decrease the adhesion of hydrates to these surfaces, has been attempted. The premise of using hydrophobic coatings is to discourage polar and non-polar deposits from adhering to internal surfaces of the pipe. In such a manner, coatings having a water contact angle in oil (WCA/O) approaching 180° would have relatively important consequences for flow assurance in oil extraction operations. Hydrophobization of metal surfaces has relied on, for example, reacting iron oxy-hydroxide functional groups present on the surface of carbon steels with trimethyl chlorosilane or chlorosiloxane oligomers, as well as the fluorine-substituted analogs of these reactants. While these strategies may result in surfaces that can be classified as hydrophobic relative to water, with water contact angles approaching 120°, these levels of hydrophobicity have been considered relatively insufficient to inhibit hydrate nucleation, growth and adhesion on metal surfaces. It is believed that superhydrophobic coatings, having WCA/O of greater than 120°, would be beneficial in realizing inhibition to nucleation, growth and adhesion of petroleum-related deposits on metal surfaces.

Hydrophobic coatings have been deposited on metallic and non-metallic substrates, including on the internal surface of 40 foot to 80 foot tubular structures that may be employed in oil and gas pipelines, for example, using plasma processes such as plasma immersion ion processing (PIIP) or plasma ion processing (PIP) and variants thereof may be used. Depending on the chemical precursors introduced into the plasma-generating process, such coatings result in useful compositions of mixed carbon allotropes, such as diamond-like carbon (DLC), Si-containing hydrocarbons, Si—O hydrocarbons, nitrogen-containing hydrocarbons and, among others, mixtures thereof. Chemical precursors, such as hexamethyldisiloxane (HMDSO, O[Si(CH$_3$)$_3$]$_2$), have been used with a PIP like process to create organosiloxane conformal coatings, such as the HMDSO coatings disclosed in U.S. Pat. No. 9,121,540, issued on Sep. 1, 2015.

In addition to WCA/O, shear adhesion of a water-ice droplet on the surface is quantified as a measure of coating performance to assess the propensity for dislodgement of hydrates and other particles due to liquid flow. The shear stresses required to dislodge a water-ice drop from the HMDSO coating described in U.S. Pat. No. 9,121,540, for example, have been shown to range between 0.04 MPa to 0.17 MPa. This result is understood to be approximately one order of magnitude of the shear stress required to dislodge a water-ice drop on an uncoated electropolished stainless steel surface.

However, HMDSO coatings, such as those described in U.S. Pat. No. 9,121,540, exhibit a degree of variation due to process and substrate variations. It is desirable to mitigate such variation and continue to lower surface energies of the coatings and improve properties such as shear adhesion of water-ice drops, toughness, and erosion resistance of the coatings. It is further desirable to incorporate fluorine into such coatings given the effect of fluorination on surface energy, wettability and surface activity. However, incorporation of fluorine into the coating compositions has proven relatively difficult.

In the past attempts were made to provide fluoro-organosiloxane coatings through co-mixing fluorocarbon and organosiloxane precursors in the plasma phase to form a hybrid condensed film. The co-mixing resulted in the incompatibility of the co-mixed condensed film with itself, the substrate or both, leading to relatively high stresses in the film and de-adhesion from the substrate in some cases. In addition, the film did not demonstrate a marked improvement in surface properties over the non-fluorinated organosiloxane coating.

A fluorinated analogue of hexamethyldisiloxane (HMDSO), bis-(trifluoropropyl) tetramethyldisiloxane, as illustrated below, was employed in a single precursor process under PII conditions to yield an adhered coating.

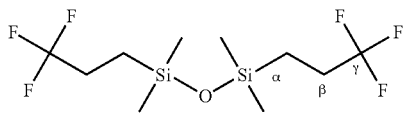 [SMILES: C[Si](C)(CCC(F)(F)F)O[Si](C)(C)CCC(F)(F)F]

However, the WCA/O was relatively low, i.e., 95.1°. It is believed that the relatively low fluorine to carbon atomic ratio in the precursor and potentially even lower ratio of fluorine to carbon in the coating may be an attributing factor to the low WCA/O yields. Higher atomic ratios of fluorine to carbon in analogues of HMDSO were believed thermodynamically unstable as attempts to fluorinate the alpha- or even beta-carbon of a siloxane (see Eq. 1) results in the conversion to tetrafluorosilane (SiF$_4$), accompanied by a relatively large heat of reaction. Other fluorocarbon precursor chemistries were explored as well for PII deposition of a fluorocarbon and fluoro-organosiloxane coatings. Table 1 provides a summary of the precursor, deposition gas mixture (flow rate, sccm), average water contact angle in oil (WCA/O) and comments.

TABLE 1

Precursor, Deposition Gas Mix and Average WCA/O

| Fluorocarbon Precursor | Deposition Gas Mixture (Flow rate, sccm) | Avg. WCA/O (deg) | Comments |
|---|---|---|---|
| Perfluorobenzene ($C_6F_6$) | TMS + (TMS/$H_2$/$C_6F_6$) (10/10/10) | 113.1 | TMS - tetramethylsilane |
| Perfluoropropane ($C_3F_8$) | HMDSO/$H_2$/$C_3F_8$ (10/10/10) | 106.3 | Absorbs water |
| Perfluoropropane ($C_3F_8$) | $C_3F_8$/$C_2H_2$ (5/51) | 108.2 | Fluorinated Diamond-Like Carbon (DLC) |
| Perfluoropropane ($C_3F_8$) | $C_3F_8$/HMDSO (5/20) | 121.3 | Poor coating adhesion, absorbs water |
| Bis-(trifluoropropyl) tetramethyldisiloxane ($C_{10}H_{20}F_6Si_2O$) | $C_{10}H_{20}F_6S_22O$/Ar (20/15) | 95.1 | Well adhered |

As can be seen from Table I, co-mixtures of organosiloxanes (e.g., TMS, HMDSO) or hydrocarbon (acetylene or $C_2H_2$) and the identified fluorocarbon precursors for PII deposition of fluoro-organosiloxane coatings resulted in WCA/O values relatively lower than those achieved by the HMDSO organosiloxane coatings of U.S. Pat. No. 9,121,540. The contact angles were similar regardless of whether deposition was performed in sequence, i.e., organosiloxane followed by fluorocarbon deposition, or as a co-mixture of both precursors in the plasma phase. Again, even though bis-(trifluoropropyl)tetramethyldisiloxane ($C_{10}H_{20}F_6Si_2O$) coating exhibited a relatively poor WCA/O, the coating exhibited relatively satisfactory consolidation and adhesion to the substrate.

Thus, it remains desirable to advance fluoro-organosiloxane coatings that exhibit relatively higher water contact angles in oil and reduced shear stresses required for dislodging of water-ice droplets formed on the surfaces of the coatings as compared to the organosiloxane coatings referred to above. It also remains desirable to identify precursors and precursor flow ratios for the formation of such coatings and processes for the deposition of such coatings.

SUMMARY

A process for the deposition of a fluoro-organosiloxane coating, comprising:
  providing a process chamber including one or more tubular substrates and an electrode positioned in said tubular substrate;
  reducing pressure in said process chamber to a first pressure in the range of 10 mTorr to 40 mTorr;
  introducing a substituted tetramethylenedisiloxane (sTMDSO) precursor

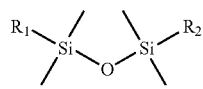

wherein $R_1$ and/or $R_2$ are selected from a carbon-hydrogen alkyl group wherein one or more of the carbon-hydrogen atoms in the alkyl group may be replaced by a carbon-fluorine linkage and wherein said sTMDSO precursor is introduced at a flow rate ($Q_{sTMDSO}$);
  introducing a perfluorinated propylene oxide (PFPO)

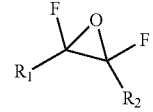

wherein $R_1$ and/or $R_2$ may a F atom or a perfluorinated alkyl group wherein said perfluorinated propylene oxide precursor is introduced at a flow rate ($Q_{PFPO}$);
  setting a flow rate ratio ($Q_{sTMDSO}/Q_{PFPO}$) in the range of 0.1 to 2.0 (g/(hr·sccm));
  applying a pulsed DC voltage to said tubular substrate; and
  depositing a fluoro-organosiloxane coating on said tubular substrate. The fluoro-organosiloxane coating so formed exhibits a water contact angle in oil (WCA/O) of greater than 155°.

In related embodiment, the present disclosure is directed at a process for the deposition of a fluoro-organosiloxane coating, comprising:
  providing a process chamber including one or more substrates to be coated within said process chamber where said substrate is the anode or cathode of an electrical circuit;
  reducing pressure in said process chamber to a first pressure in the range of 10 mTorr to 40 mTorr;
  introducing a substituted tetramethylenedisiloxane (sTMDSO) precursor

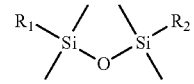

wherein $R_1$ and/or $R_2$ are selected from a carbon-hydrogen alkyl group wherein one or more of the carbon-hydrogen atoms in the alkyl group may be replaced by a carbon-fluorine linkage and wherein said sTMDSO precursor is introduced at a flow rate ($Q_{sTMDSO}$);
  introducing a perfluorinated propylene oxide (PFPO)

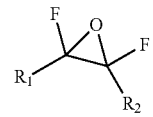

wherein $R_1$ and/or $R_2$ may a F atom or a perfluorinated alkyl group wherein said perfluorinated propylene oxide precursor is introduced at a flow rate ($Q_{PFPO}$);
  setting a flow rate ratio ($Q_{sTMDSO}/Q_{PFPO}$) in the range of 0.1 to 2.0 (g/(hr·sccm));
  providing a second electrode to complete said circuit and applying a pulsed DC voltage to said substrate; and
  depositing a fluoro-organosiloxane coating on said substrate. The fluoro-organosiloxane coating so formed exhibits a water contact angle in oil (WCA/O) of greater than 155°.

BRIEF DESCRIPTION OF THE FIGURES

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
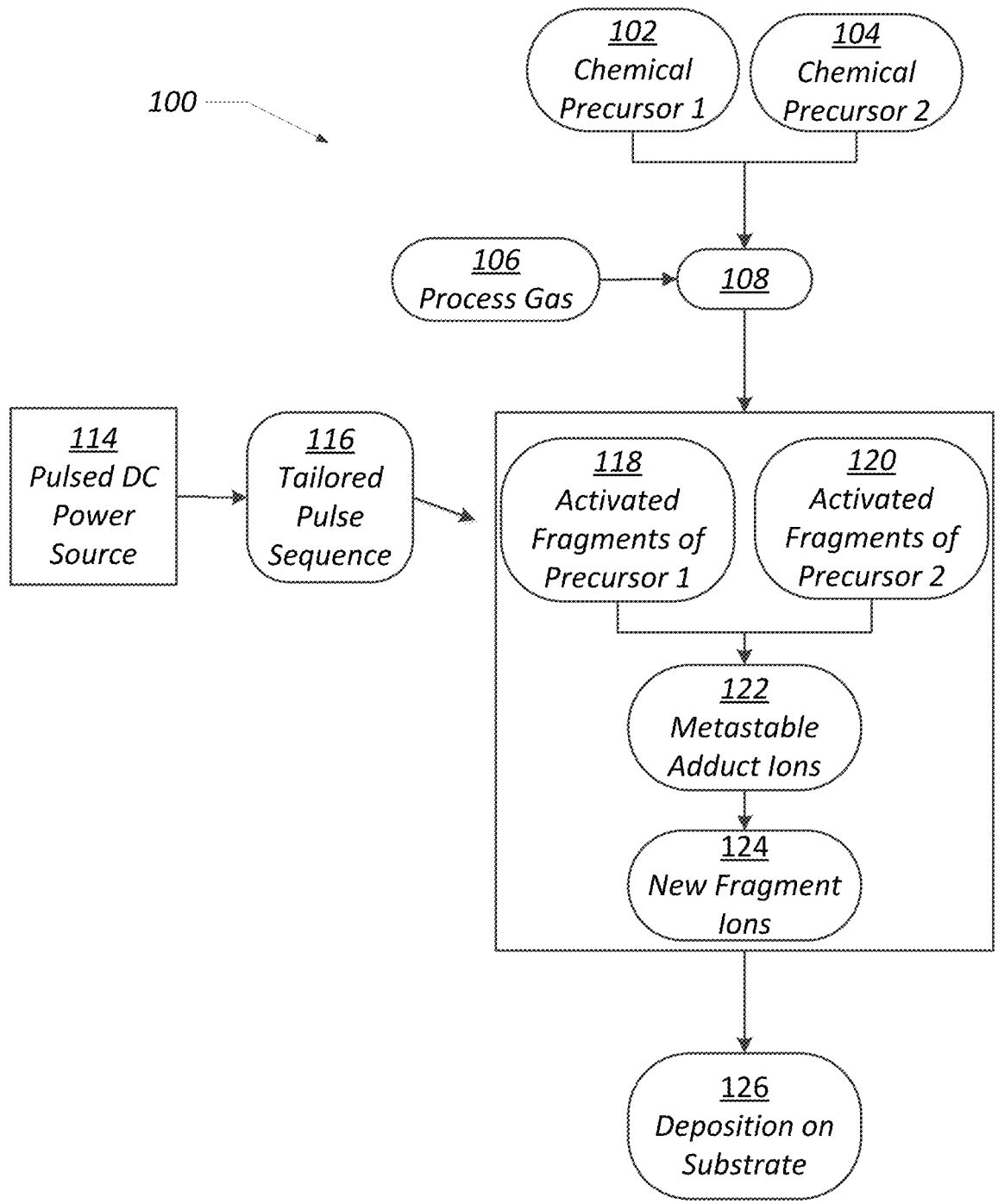
FIG. 1 illustrates a general schematic of a system and process for producing the fluoro-organosiloxane coatings described herein.

The present disclosure provides fluoro-organosiloxane compositions and conformal coatings, exhibiting relatively high water contact angles in oil, through the activation of two or more chemical precursors. The precursors are preferably chemically activated through electric-field ionization and collisional ionization as well as dissociation generated using pulsed DC voltage which may be provided via an electrode. Ionized fragment species derived from the precursors combine to form metastable ionized adducts in the plasma phase. The ionized adducts are then accelerated to the surface of a metallic or non-metallic substrate (e.g. a tubular substrate) forming a coating. Such substrate may therefore serve as the anode or cathode of the developed electrical circuit. The processes of adduct formation may be endothermic in nature, exothermic in nature, or, preferably, a combination thereof. Furthermore, the process herein preferably allows for an increase in the fluorination of the siloxane precursors.

The precursor flow rate and pulse sequence of the plasma-generating power source is preferably selected to adjust the populations of molecular ion fragments derived from the chemical precursors. The ion fragments may have a relatively broad range of thermochemical stabilities and lifetimes. In particular, it has been found herein that control of precursor flow rate (and therefore stoichiometric ratio of the precursors) during the coating process can provide the desired metastable adducts and resulting coating compositions.

Further, the distribution of fragment species and their relative abundances may be preferably altered through non-steady state, dynamic field excitation as evoked by continuous sequence of electric field pulses, such as transient DC voltage ($V_{pw}$) pulses, having characteristic pulse-width duration ($t_{pw}$), frequency ($f_{pw}$), period ($t=1/f_{pw}$), and duty cycle ($t_{pw}/t$). Relatively high intensity, short-pulse width sequences may produce relatively high impulse (i.e., $V_{pw} \times I_{pw}$), yet low average power depending on the duty cycle of the pulse sequence. Accordingly, it is contemplated that the process may be tailored to target the formation of certain intermediate compositions leading to the desired metastable adducts.

In preferred embodiments, the precursors include a perfluorinated propylene oxide of the following general structure:

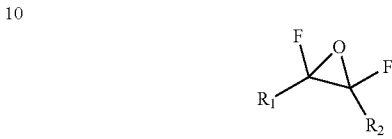

wherein $R_1$ and/or $R_2$ may be a F atom or a perfluorinated alkyl group such as a perfluorinated methyl group thereby providing hexafluoropropylene oxide (HFPO)

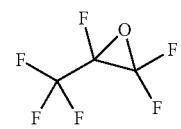

It is noted that HFPO is preferred herein due to its relatively strained epoxide ring, making it susceptible to ring opening and formation of excited intermediaries and fragments for subsequent addition to excited intermediaries and fragments of the HMDSO prior to the species being accelerated to the substrate.

The other precursor is a substituted tetramethyldisiloxane

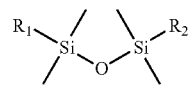

wherein $R_1$ and/or $R_2$ may be a carbon-hydrogen (C—H) type alkyl group such as a methyl (—CH$_3$), ethyl (—CH$_2$CH$_3$) or propyl (—CH$_2$CH$_2$CH$_3$) group thereby providing the precursor hexamethyldisiloxane (HMDSO)

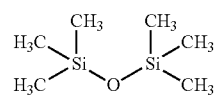

Additionally, $R_1$ and $R_2$ in the substituted tetramethyldisiloxane precursor may include the aforementioned alkyl groups wherein one or more of the C—H atoms in the alkyl group may be replaced by a carbon-fluorine (C—F) linkage, as in bis-(trifluoropropyl)tetramethylenedisiloxane.

The fluoro-organosiloxane coatings may be applied to various structures, and in particular to the inner surfaces of tubular structures, having a length to diameter (or longest linear dimension across the cross-section) ratio of 48:1 or greater, such as in the range of 48:1 to 150:1, and in particular long tubular structures of 2 feet or greater, such as in the range of 2 feet to 80 feet. The longest linear dimension across a cross-section may include, for example, the dimension across a square from corner to corner, the longest dimension from corner to corner of a rectangle, the longest dimension across an ellipse, etc. Reference to the diameter herein also implies the longest linear dimension across the cross-section. The coated tubular structures may be used in oil and gas production, including off-shore operations, with the aim of reducing hydrate agglomeration within the pipelines. The coated substrates may also be utilized in other applications where relatively high water contact angles and relatively low shear stress for dislodgement of water-ice drops would be of benefit.

FIG. 1 illustrates a general embodiment of the plasma ion process for depositing the coatings herein. The process 100 includes the introduction of chemical precursors 102, 104 and other process gasses 106 which are mixed and vaporized at 108 and introduced into plasma chamber. The chemical precursors may be provided in volatile form (i.e., in a gas phase at standard conditions) or in liquid form and converted to a vapor prior to their introduction. Additional process gasses may include inert gasses such as, but not limited to, argon and other noble gasses. The process gasses may be used to dilute the plasma precursors or to pre-clean the substrate.

A relatively high impulse voltage, current pulsed DC power source 114 may be employed to provide a voltage to the substrate, worktable and/or process chamber to generate plasma from the chemical precursors and process gasses. The output of the power source 114 may be programed to excite the mixture in the process chamber according to a tailored pulse sequence at 116 by selecting an appropriate set of characteristics parameters; namely, transient DV voltage pulse ($V_{pw}$), pulse-width duration ($t_{pw}$) and frequency ($f_{pw}$). These particular parameters may be tailored to evolve a select ensemble of activated fragment ions of each respective chemical precursor 118, 120 such that particular metastable adducts 122 as cations, anions, radials and radical-ions are preferentially formed in the plasma phase, which prior to acceleration onto the substrate, may form new fragments 124, depending on their mass and lifetime. A coating is then deposited on the substrate surface 126. In such a process, the substrates may assume any number of shapes and sizes.

Figure 2:
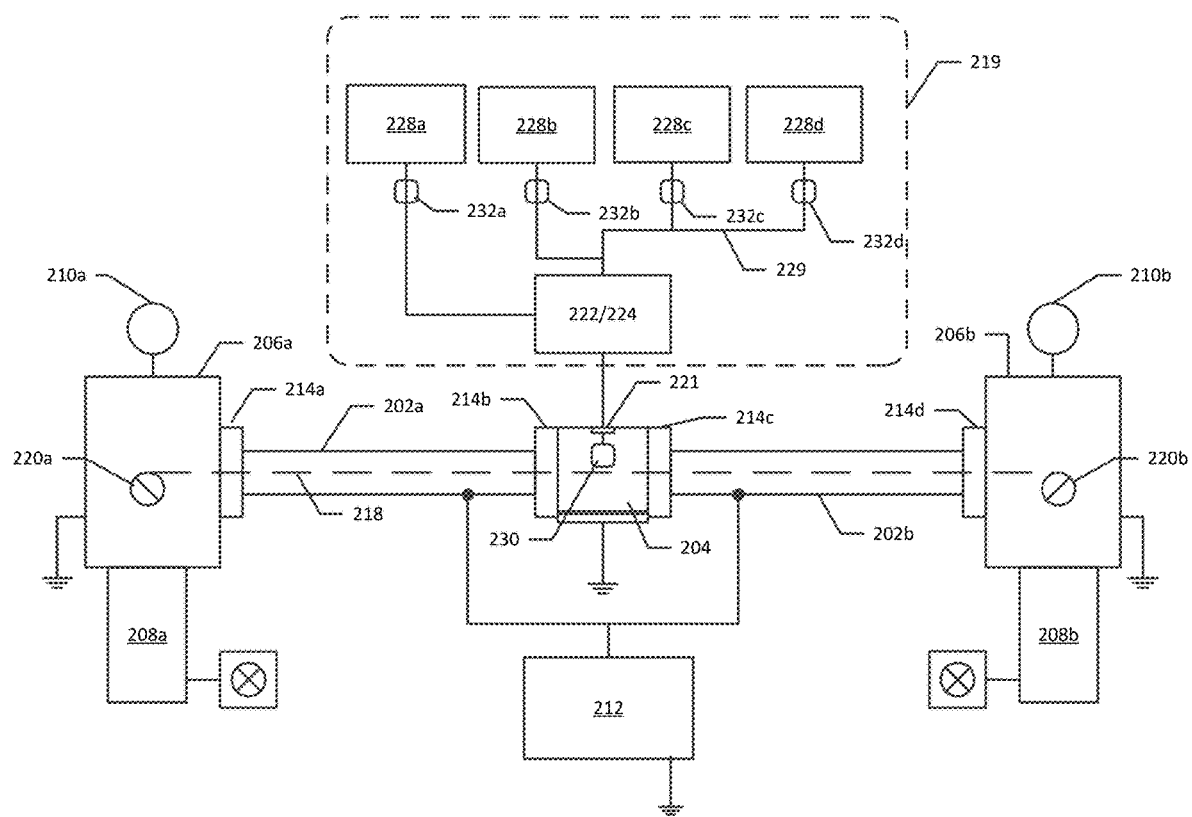
FIG. 2 illustrates a schematic of a preferred embodiment of a system for producing the fluoro-organosiloxane coatings described herein.

FIG. 2 illustrates a preferred embodiment of a system for depositing the fluoro-organosiloxane coatings. As illustrated, the apparatus includes two tubular substrates 202a, 202b which represent one example of a substrate object to be coated. Alternatively, one tubular structure or more than two tubular structures may be utilized, such as three or four tubular structures. The tubular structures preferably exhibit a length to diameter ratio of 48:1 or greater, such as in the range of 48:1 to 150:1, and are preferably 2 feet or greater, such as in the range of 2 feet to 80 feet in length, including all values and ranges therein. As one or more tubular structures may be treated at any one time, for example, from 2 to 6 lengths of pipe, up to 40 feet, 80 feet, 120 feet or 160 feet of pipe may be coated at any one time.

As illustrated, the tubular structures 202a, 202b may be connected to each side of an intervening coupling chamber 204, preferably symmetrically arranged around the coupling chamber, and each structure may be end capped with a vacuum pumping station 206a, 206b. The tubular structure, coupling chamber and pumping stations are collectively referred to herein as a process chamber. The vacuum pumping stations 206a, 206b may include primary and secondary vacuum pumps 208a, 208b. Vacuum gages 210a, 210b, may be provided at either vacuum pumping station 206a, 206b to provide an indication of vacuum pressure in the pumping stations 206a, 206b.

The vacuum chambers 206a, 206b and the center coupling chamber 204 are preferably electrically connected to ground potential. In the alternative, they may be biased using an AC or DC power supply. The tubular structures 202a, 202b as the substrates to be coated may be preferably energized (i.e., electrically biased) with relatively high-voltage negative or positive DC pulse sequences at selected amplitude, frequency, pulse width, and duty cycle as noted above using a relatively high voltage/current pulsed DC power supply 212. The tubular structures 202a, 202b are electrically isolated from the coupling chamber 204 and the vacuum end-chambers 206a, 206b using tubular insulators 214a, 214b, 214c, 214d, which may be formed from, for example, plastic or ceramic, at each coupling point between chamber and tubular structure.

To further homogenize (even out) the electric field gradients transiently-generated by each pulse sequence, a second electrode, such as an internal tubular or solid electrode 218 of relatively small diameter (e.g., in the range of 0.0625 to 0.5 inches in outer diameter) preferably spans the entire length L of the tubular structures 202a, 202b, from vacuum end-chamber to vacuum end-chamber 206a, 206b. The electrode is preferably centrally suspended under tension and electrically connected to ground potential. Tension may be provided by springs 220a, 220b; however, other mechanical tensioning mechanisms may be envisioned herein as well. The electrode preferably completes the electrical circuit of the relatively high voltage DC power supply 212.

The various process gasses, i.e., the precursor gasses and diluent gasses (if needed), may be provided into the process chamber from a process gas supply system 219 through a process gas introduction port 221. As illustrated, the gas introduction port 221 is provided in the center coupling chamber 204. In addition, or alternatively, the gas introduction port 221 may be provided in the vacuum chambers 206a, 206b. It should be appreciated that process gasses refers to herein, any gas or vapor that may be used in the process for forming the coatings.

A process gas mixing chamber 222 is preferably provided to mix the process gasses prior to introduction into the center coupling chamber 204. The process gasses may be stored in gas or liquid form in various storage tanks 228a, 228b, 228c, 228d. When stored in liquid form, the liquid may be vaporized prior to introduction into the process chamber using a heater. The heater 224 may be located within the process gas mixing chamber. Additionally, or alternatively, the heater is wrapped around the process gas lines 229. Additional flow control valves and regulators, not illustrated, may be utilized to regulate the flow of the precursor gasses and diluent or inert gasses into the process chamber (tubular structures 202a, 202b and center coupling chamber 204). A gas diffuser 230 may be affixed to the introduction port 221 to diffuse gas through the process chamber. In addition, individual mass flow controllers 232a, 232b, 232c, 232d may be used to control the flow rates and ratios in which the process gasses are introduced into the process chamber (tubular structures 202a, 202b and center coupling chamber 204).

Upon metering of each precursor and diluent gas, the output streams are combined, mixed and further vaporized (as needed) to preferably yield a relatively well-mixed process gas of the combined components at a metered rate for injection into the process system through the gas introduction port 221. In particular, for precursors supplied in a liquid form, such as hexamethyldisiloxane (HMDSO), the liquid may be stored in a storage tank, such as 228b. A liquid flow controller 232b may be employed upstream of the temperature-controlled mixer and vaporizer (heater) 222/224. Upon reaching the temperature controlled mixer 222, the liquid may be combined at elevated temperature with a metered diluent gas through a system of orifices to aerosolize the mixture and provided a metered flow of vapor.

In a process of forming the coatings, the pulsed voltage from the power supply provides a dynamic field excitation that is preferably biased negatively relative to system ground, allowing positive ions generated by the formation of a plasma in the hollow space of the tubular structures to be accelerated to the internal surface of the tubular structure with relatively high terminal velocities and, consequently, relatively high kinetic energy. The fragmentation of the chemical precursor in the plasma forms ions and the energetic collisions of the ions with the internal surface of the tubular structure assists in providing the means by which the coating composition of the present disclosure is formed. It is noted that while cationic and anionic species of fragment ions and metastable adducts are formed, species including both cationic and anionic activity may be formed in the plasma and accelerated at the substrate.

In an exemplary case, the characteristic pulses sequence may consist of a negatively biased, pulsed voltage ranging from 0.5 to 1.5 kV with a pulsed frequency ranged from 500 Hz to 1000 Hz, and a pulse width ranging from 5 to 40 μs, exhibiting a peak current of 5 A to 20 A. Such pulse parameters may be selected based on the selected fluorocarbon and organosiloxane precursors, to evoke a desired distribution of fragment ions and adducts in the plasma. It may be preferable to tailor a pulse sequence in which the pulsed voltage is instead biased positively and its amplitude, pulse width, and frequency set to different values from the specified ranges above. A preferred process for providing fluoro-organosiloxane coatings is described further herein. In particular embodiments, the process begins with the cleaning of the interior surface of the tubular structures to be coated as the structures may be contaminated with various organic or inorganic species, including various surface oxides. As alluded to above the tubular structures may be metallic or non-metallic in nature. Metallic compositions include, but are not limited to, iron and iron based alloys such as stainless steel or carbon steel, aluminum alloys, titanium alloys and nickel alloys. Iron alloys may include one or more transition metals, such as chromium, nickel, molybdenum and tungsten, and optionally one or more non-metals or metalloids such as carbon, silicon, phosphorus and boron. Non-metallic compositions may include thermoplastic and thermoset polymer materials, glass, and ceramic. In addition, reference to a tubular substrate may be understood, not only as reference to a substrate that may exhibit a circular cross-section, but also to those exhibiting other geometries including polygons such as squares, triangles, or rectangles, or figures bound by one or more curves and may be oval or elliptical.

The pressure in the process chamber may be reduced to a pressure in the range of 0.1 m Torr to 100 mTorr, including all values and ranges therein. Referring again to FIG. 2, an inert gas, such as argon or other noble gases, alone or in combination with a reactive gas, such as hydrogen or nitrogen, is supplied to the process chamber, i.e., the tubular structures 202a, 202b, and the center coupling chamber 204, through the process gas supply system 219 and through the gas introduction port 220. The pressure in the process chamber may then be preferably maintained in the range of 1 mTorr to 100 mTorr, including all values and ranges therein. While maintaining the gas pressure at this level, a negatively biased pulsed voltage ranging from 0.5 to 1.0 kV, including all values and ranges therein, with a pulse frequency ranging from 500 Hz to 1,000 Hz, including all values and ranges therein, and a pulse width ranging from 5 to 40 μs, including all values and ranges therein is applied to the tubular structures for a period ranging from 30 minutes to 120 minutes, including all values and ranges therein. The peak current is in the range of 20 A to 40 A, including all values and ranges therein. Positive ions (i.e., $Ar^+$ ions) generated by the plasma are accelerated to the internal surface of the tubular structures with relatively high kinetic energy, resulting in the sputter cleaning of surface contaminants from the internal surfaces of the structure.

Following the cleaning procedure, the fluorocarbon and organosiloxane precursors are preferably co-mixed with a diluent gas and introduced into the process chamber. As noted above, preferred precursors include hexafluoropropylene oxide (HFPO) and hexamethyldisiloxane (HMDSO). The diluent gas preferably includes an inert gas, such as argon.

The siloxane gas (i.e. the substituted tetramethyldisiloxane as described herein) subsequent to volatilization from liquid state, is preferably introduced at a flow rate in the range of 1 grams per hour to 15 grams per hour, including all values and ranges therein. The fluorocarbon gas (i.e. the perfluorinated propylene oxide) is preferably introduced at a flow rate in the range of 2 sccm to 5 sccm, including all values and ranges therein. The term "sccm" is reference to standard cubic centimeters per minute. The diluent gas is preferably introduced at a flow rate in the range of 40 sccm to 90 sccm, including all values and ranges therein, when introduced, or 0 sccm when omitted. The flow rates are preferably maintained at a constant rate through the deposition process. Alternatively, the flow rates may be adjusted and varied through the deposition process to alter the coating composition.

As noted above, the substituted tetramethylenedisiloxane (sTMDSO) precursor is introduced at a flow rate ($Q_{sTMDSO}$) and the perfluorinated propylene oxide (PFPO) is introduced at a flow rate ($Q_{PFPO}$) such that the ratio ($Q_{sTMDSO}/Q_{PFPO}$) falls in the range of 0.1 to 2.0 (g/(hr·sccm)). In preferred embodiments, hexamethyldisiloxane is the substituted tetramethylenedisiloxane (sTMDSO) precursor and hexafluoropropylene oxide is the perfluorinated oxide precursor. Further, the flow ratio of HMDSO to HFPO is preferably maintained constant through the coating process once a ratio is selected. Alternatively, the flow rate may be adjusted between the ratios set forth above. It is noted herein that these preferred flow ratios of HMDSO and HFPO precursors influence the distribution of fragment species in the plasma phase for the formation of plasma-phase adducts (discussed further below) and preferably allow for the desired surface energies and desired water contact angles in oil (WCA/O) of greater than 155°, and preferably in the range of 155° to 170°. It is also noted that the total flow of the precursor mixture (i.e., Ar, HMSDO and HFPO) and process pressure may only be relevant to the specific nature of the coating process equipment and the volume or surface area of the structure being coated, so long as the preferred flow rate ratios are maintained as noted.

Referring again to FIG. 2, the flow lines and mixing/vaporizer unit 222/224 is preferably maintained at a constant temperature depending on the precursor gasses. In the case of HMDSO, the flow lines and mixing/vaporizer unit 222/224 are preferably maintained at a temperature in the range of 60° C. to 65° C., including all values and ranges therein. The gas space in the tubular structures 202a, 202b is preferably maintained at a constant pressure in the range of 10 mTorr to 40 mTorr, including all values and ranges therein. The pressure of the gas space may be determined by the vacuum gages 210a, 210b.

To initiate deposition of the coating onto the internal surfaces of the tubular structure, plasma is formed in the gas space by electrically exciting the tubular structure through the application of a pulsed voltage. Preferably the pulsed voltage ($V_{pw}$) is negatively biased and in the range of 0.5 kV to 1.5 kV, including all values and ranges therein, with a pulsed frequency ($f_{pw}$) ranging from 500 Hz to 1000 Hz, including all values and ranges therein, a pulse width ($t_{pw}$) ranging from 5 to 40 μs, including all values and ranges therein, and a peak current ($I_{pw}$) ranging from 5 A to 20 A, including all values and ranges therein. Deposition is preferably carried on for 5 minutes to 120 minutes, including all values and ranges therein.

As noted above, when fluorinated analogues of HMDSO are employed, fluorination of the alpha and beta positions of the siloxane, as identified below are not preferred due to instability:

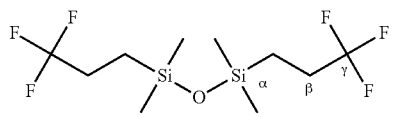 [SMILES: C[Si](C)(CCC(F)(F)F)O[Si](C)(C)CCC(F)(F)F]

The present process, described herein, provides for increased fluorination of siloxanes through the formation of transient ionized adducts which are then accelerated to the surface of the substrate where polymerization may subsequently occur. As noted above, in the present process the perfluorinated propylene oxide and substituted tetramethylenedisiloxane precursors and preferably the hexafluoropropylene oxide (HFPO) and hexamethyldisiloxane (HMDSO) precursors, form excited intermediates and fragment ions due to electron impact ionization, which then produce various metastable adducts.

Potential fragment ions of HFPO include those listed below in Table 2. These species were confirmed as being present in the plasma using mass spectrometry, generated by the process described herein. Relative abundance and stability values were calculated using first principle computations described further in the Examples presented below.

TABLE 2

Fragment Ions of HFPO Generated by Electron Impact Ionization

| Fragment Ion | Molecular Mass (m/z) | Relative Abundance/Stability |
| --- | --- | --- |
| $CF^+$ | 31 | 0.50 |
| $CFO^+$ | 47 | 0.25 |
| $CF_2^+$ | 50 | 0.30 |
| $CF_3^+$ | 69 (Parent Ion) | 1.00 |
| $C_2F_3^+$ | 81 | 0.26 |
| $C_2F_3O^+$ | 97 | 0.10 |
| $C_2F_4^+$ | 100 | 0.27 |
| $C_2F_5^+$ | 119 | 0.25 |

TABLE 2-continued

Fragment Ions of HFPO Generated by Electron Impact Ionization

| Fragment Ion | Molecular Mass (m/z) | Relative Abundance/Stability |
| --- | --- | --- |
| $C_3F_5^+$ | 131 | 0.01 |
| $C_3F_5O^+$ | 147 | 0.05 |
| $C_3F_6O^+$ | 166 | <0.01 |

Potential fragment ions of HMDSO include those listed below in Table 3. These species were also identified using mass spectrometry in plasma generated from the process described herein. Again, relative abundance and stability values were calculated using first principle computations described further in the examples presented below.

TABLE 3

Fragment Ions of HMDSO Generated by Electron Impact Ionization

| Fragment Ion | Molecular Mass (m/z) | Relative Abundance/Stability |
| --- | --- | --- |
| $CH_3^+$ | 15 | 0.021 |
| $SiCH_3^+$ | 43 | 0.023 |
| $SiOH^+$ | 45 | 0.007 |
| $SiCH_5^+$ | 45 | 0.050 |
| $Si_2OC_2H_8^{++}$ | 52 | 0.019 |
| $SiC_2H_7^+$ | 59 | 0.057 |
| $SiOC_4H_{12}^{++}$ | 66 | 0.089 |
| $SiOH^+$ | 73 | 0.016 |
| $SiC_3H_9^+$ | 73 | 0.085 |
| $Si_2OC_4H_{11}^+$ | 131 | 0.038 |
| $Si_2OC_4H_{13}^+$ | 133 | 0.014 |
| $Si_2OCH_5H_{15}^+$ | 147 (Parent Ion) | 1.000 |
| $Si_2OC_6H_{18}^+$ | 162 | 0.001 |

The intermediates described above, their relative abundance, and temporal lifetimes, assume steady state conditions and may be altered upon selection and alteration of DC pulse parameters of the relatively high voltage pulsed DC source. In particular, the distribution of fragment species and their relative abundances may be altered through non-steady state, dynamic field excitation as evoked by continuous sequence of electric field pulses, such as transient DC voltage ($V_{pw}$) pulses, having characteristic pulse-width duration ($t_{pw}$), frequency ($f_{pw}$), period ($t=1/f_{pw}$), and duty cycle ($t_{pw}/t$). Relatively high intensity, short-pulse width sequences may produce relatively high impulse (i.e., $V_{pw} \times I_{pw}$), yet low average power depending on the duty cycle of the pulse sequence.

Table 4 provides a matrix of probable fragment ions and metastable adducts that may be present in the plasma being formed from the fragment ions in the process above utilizing the preferred precursors of hexamethyldisiloxane and hexafluoropropylene oxide in an argon plasma utilizing argon ion ($Ar^+$) and electron ($e^-$) collisions. In the left hand column are the fragment ions of HMDSO, which exhibits a mass/charge ration of 162. In the top row are the fragment ions of HFPO, which exhibits a mass/charge ratio of 166. The various cationic, anionic and cationic/anionic species are noted. These adducts may undergo further fragmentation, form new daughter species (not shown), or be energetically deposited onto the substrate. Reference numbers are underlined and assigned to each species for further reference herein. Mass/charge ratio of each species is provided in brackets and the manner of calculation is described further below in the examples.

TABLE 4

Representative Fragment Ions and Metastable Adducts Temporarily Formed in Plasma

| Fragment Ions | 7[69] | 8[50] | 9[166] |
|---|---|---|---|
| | $CF_3^+$ (F$_3$C$^+$—F) | [$^1A_1$ :CF$_2$ ↔ $^3B_1$ ·CF$_2$·] | (CF$_3$)$_2$C$^+$–O$^-$ with F substituents |

| 3[147] | 10[216] | 11[197] |
|---|---|---|
| —Si—O—Si$^+$— | Si—O$^{+}$—Si with CF$_3$ groups | Si—O—Si—CF$_3$ cation |

4[131] — Si—O—Si$^+$=

12[181] — cyclic Si—O—Si$^+$ with =CHF and =CH$_2$

| 5[73] | 13[123] | 14[239] |
|---|---|---|
| >Si$^+$— | —Si—C$^+$F$_2$ | —Si—O—C(CF$_3$)$_2$–C$^+$F$_2$ |

| 6[89] | 15[139] | 16[255] |
|---|---|---|
| >Si—O$^-$ | >Si—O—C$^+$F$_2$ | >Si—O—C(CF$_3$)(F)—C(F)(O$^-$)F |

Plasma Adducts

It is noted that singlet and triplet states of fragment species 8 are shown in the matrix above. As discussed further in the examples below, the energy for plasma formation of the adducts from the chemical precursors are set forth in Table 5 below. It is noted that all energies are in kcal/mol with thermal corrections for the formation enthalpy at standard conditions, i.e., 1 atm, 298K. Further, the plasma species are referred to by the reference numbers presented in the matrix of Table 4 above.

TABLE 5

Theoretical Energies of Plasma Formation of the Adducts

| Plasma Species Adduct Reaction | Adduct Electronic Energy | Adduct ZPE | Thermal Correction Energy | Adduct Formation Enthalpy |
|---|---|---|---|---|
| 3 + 7 → 10 | −747897.22 | 128.08 | 140.32 | −426.56 |
| 3 + 8 → 11 | −685018.38 | 125.95 | 137.60 | −13.62 |
| 4 + 8 → 12 | −659530.41 | 95.5 | 105.14 | −45.35 |
| 5 + 8 → 13 | −405928.05 | 76.26 | 83.08 | −23.82 |
| 5 + 9 → 14 | −751683.59 | 94.16 | 105.74 | −6.96 |

TABLE 5-continued

Theoretical Energies of Plasma Formation of the Adducts

| Plasma Species Adduct Reaction | Adduct Electronic Energy | Adduct ZPE | Thermal Correction Energy | Adduct Formation Enthalpy |
|---|---|---|---|---|
| 6 + 8 → 15 | −453195.54 | 79.58 | 87.55 | 156.18 |
| 6 + 9 → 16 | −799188.34 | 95.37 | 107.31 | −69.24 |

It is noted that the formation of adduct 15 is endothermic. Thus, the pulse DC plasma conditions allowed for theoretical enthalpies of adduction formation that are endothermic, exothermic, or both exothermic and endothermic.

The species are accelerated to the substrate surface at kinetic energies and terminal velocities governed by the characteristic parameters of the pulse sequence employed. Upon collision and interaction with the substrate, the species may undergo additional reactions, such as polymerization. A relatively dense and conformal coating is then formed and well adhered to the surface. Namely, the coating is gas impermeable. The thickness of the coating is preferably governed by deposition time and pulse parameters.

It is noted that, in particular, the fluro-organosiloxane coatings formed herein preferably exhibit a fluorine content of 41 at. % over all structural moieties of the coating composition, including all values and ranges from 4 to 41 at. %. The resulting coating may also include, consist essentially of, or consist of one or more amorphous domains, including, but not limited to, domains of —Si—O—Si—, —Si(CF$_3$)$_x$— [x=1,2], —Si(CHF$_2$)$_x$ [x≥1], —Si—(CF$_2$)$_x$—Si— [x≥1], and —Si—(CH$_2$)$_x$—Si— [x≥1] as observed via raman spectroscopy and measured at a laser excitation of 532 nm. Further, as noted above, the resulting coatings exhibit superhydrophobic properties, i.e., water contact angles in oil (WCA/O) of greater than 155°, and preferably in the range of 155° to 170°, the determination of water contact angles in oil is described further below. The resulting coatings may also exhibit a shear stress for dislodgement of water-ice drops of 0.06 MPa or less, and preferably in the range of 0.001 to 0.06 MPa, the measurement of which is also described further below. The coatings may mitigate the nucleation, growth, and adhesion of hydrocarbon hydrates, asphaltenes, waxes, inorganic scales, and other hydrocarbon deposits. In addition, the coatings may be conformal, i.e., conforming to the surface of the substrate and exhibiting less than a 10% variation in thickness across surfaces to which it has been applied.

Figure 3:
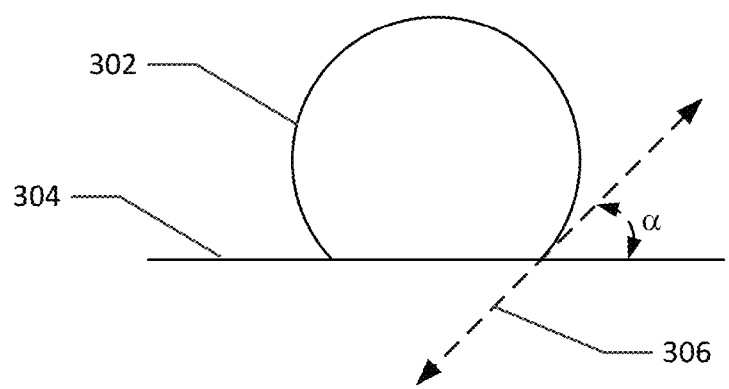
FIG. 3 illustrates a schematic of a method for the measurement of water contact angle in oil, WCA/O.
Figure 4:
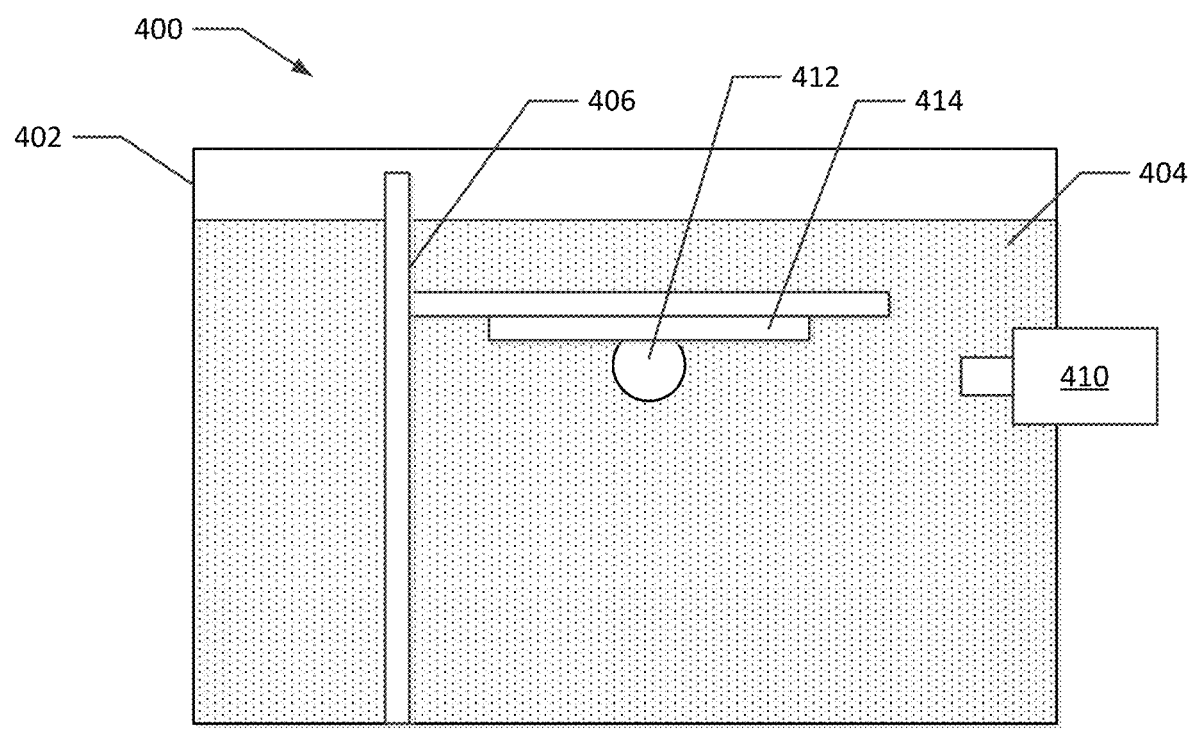
FIG. 4 illustrates a schematic of an apparatus for the measurement of water contact angle in oil.

As illustrated in FIG. 3, the water contact angle in oil (WCA/O) is understood as the angle α formed by a water droplet 302 between the surface plane of the coated substrate 304, parallel with the solid water interface, and the tangent line 306 at the water-oil interface intersecting the surface plane at the solid-water-oil-triple point. By this convention, whether measured in air or in oil, hydrophobicity increases with increasing water contact angle. Measurement of the water contact angle may be achieved by various known methods, which include, for example, a goniometer coupled with a relatively high-resolution digital camera. As illustrated in FIG. 4, the WCA/O as measured herein is preferably measured using a system 400 consisting of a transparent immersion tank 402, containing mineral oil 404, a pivoting sample holder 406, and a relatively high-resolution digital camera 410 for imaging the three-contact region of a water drop (10 µl, MILLI-Q) 412 on the surface of the test coupon 414.

Figure 5:
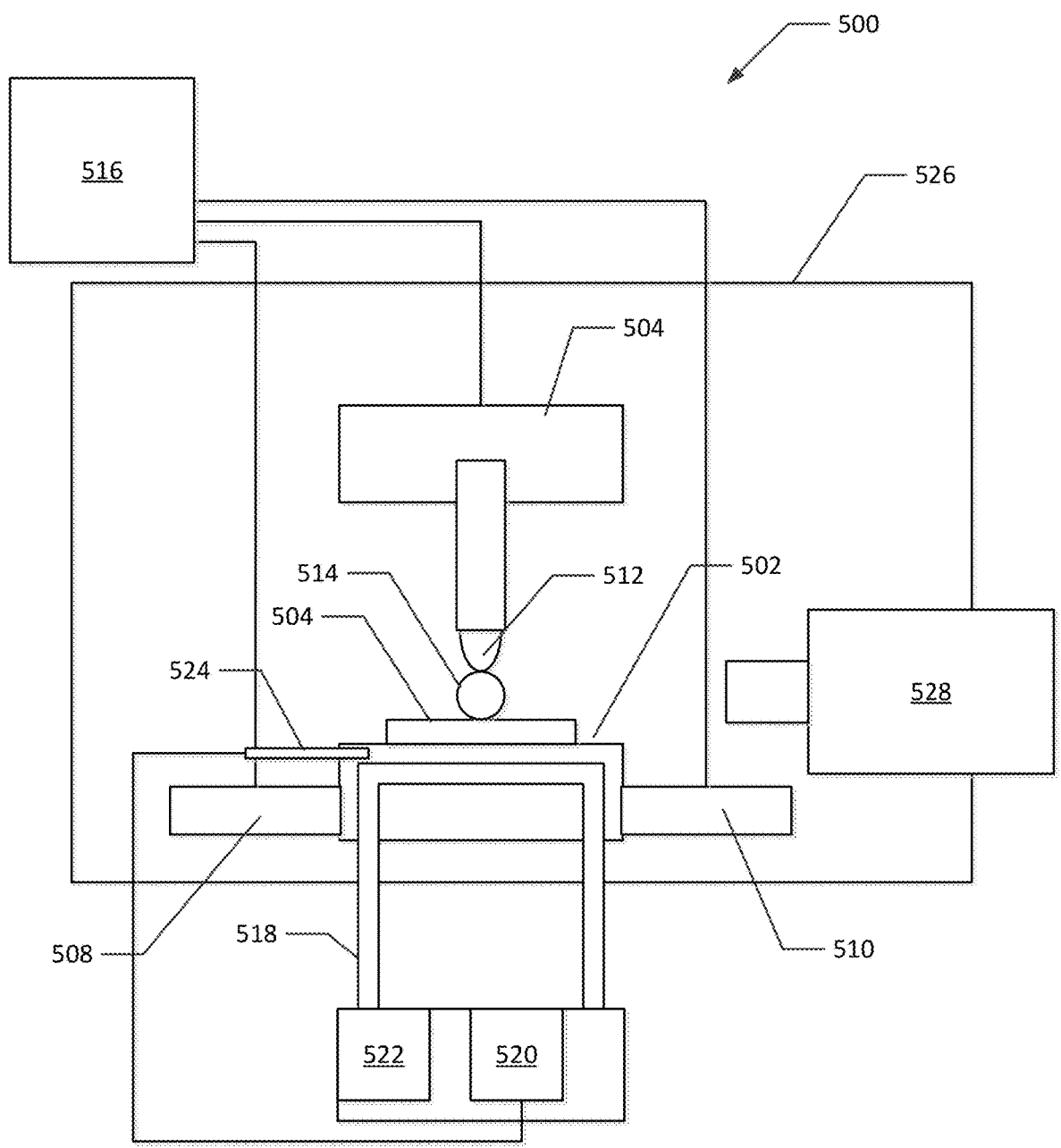
FIG. 5 illustrates a schematic of an apparatus for the measurement of water-ice displacement shear force.

Shear-adhesion strength of water-ice drops on the substrate surface is understood herein as the shear stress at which water-ice is detached from the surface of the substrate. Measurement of the shear-adhesion strength was performed herein using a measurement apparatus as illustrated in FIG. 5. The measurement apparatus 500 includes a specimen holder 502 onto which a coated sample substrate 504 is placed. The specimen holder is affixed to two horizontal load cells 508, 510 one on each side of the sample 504. These load cells measure the shear force upon horizontal scanning of a vertically mounted conical tip 512 of 1 mm in radius. The tip 512 is also connected to a load cell that simultaneously measures the force in the vertical direction, normal to the sample surface. A 10 µl ultra pure water drop (MILLI-Q) 514 is placed on the sample surface.

The tip is then aligned, with a remote controlled computer interface 516, with the water droplet and lowered down to touch the sample surface using the vertical load cell to indicate contact. The tip is then slowly raised from the surface until the contact force in the vertical direction is zero. At this position, the tip clears the droplet surface. The sample and the tip are cooled to ≤−° C. via fluid lines 518 filled with ethylene glycol connecting the specimen holder and tip to a thermoelectric cooler 520 and recirculation pump 522 while continuously monitoring and recording temperature with a temperature probe 524. The device is placed in an isolation box 526 and purged with nitrogen to avoid condensation of laboratory air on the cold specimen. Digital images are acquired with a relatively high-resolution camera 528 to observe the freezing process of the water droplet and to determine the apparent contact area between the frozen water droplet and the sample surface.

After the water droplet freezes, on the sample surface, the tip is then controlled via the computer interface to move horizontally at a rate of 1 mm/s to push the frozen water droplet. The average force of the two horizontal load cells during the pushing/shearing process is recorded as the shear force. The contact area between the ice droplet and the surface is calculated based on the image of the droplet taken just before pushing the frozen droplet. The shear stress is calculated as the ratio of the shear force and the contact area. The ice adhesion strength is calculated as the shear stress at which the frozen water droplet becomes detached from the sample surface as indicated by a sudden drop in the sensed shear force to zero.

EXPERIMENTAL

Theoretical Analysis

The excited-state fragment ions evolved from HMDSO and HFPO were theoretically predicted (see Tables 2-5 above) with the probable predictable pathways leading to the formation of metastable adducts in the plasma phase of the process. The predictions were performed using first principle computational methods at the level of Density Functional Theory (DFT). The chemical intermediates were built, and their equilibrium geometries were optimized (i.e., lowest energy conformer) with analytical gradient methods at the level of DFT/6-311++g (2d2p). Closed shell (restricted) and open shell (unrestricted) wavefunctions were solved using the self-consistent field (SCF) method. In this case, DFT-level electron exchange and correlation potentials were computed from the hybrid 2-parameter B3LYP functional.

Vibrational infrared and Raman frequencies and zero point energies (ZPE) were obtained from the analytical second derivatives calculated at the stated level of theory. In all cases, thermal contributions (½RT), including vibrational, rotational and translational contributions, were computed at 298 K. The enthalpy difference for a given reaction is the energy difference (electronic+ZPE+thermal) plus the change in PV work. Isodesmic reactions were set up for the reactants and products so that ΔPV=0, thus avoiding the need to consider changes in PV work in the energy expression for deriving enthalpies.

Laboratory Analysis

A relatively small scale plasma immersion ionization deposition system was set up to mimic the chamber ID dimensions and electrode configuration employed to coat internal surfaces of long, 40 foot, coupled pipe sections. For the small-scale system, a stainless-steel tubular section (4.5-inch OD×3-ft length), tubular chamber, was connected to a larger vacuum chamber and a relatively high-vacuum pumping system.

Test coupons of 1 inch by 1 inch in dimension composed of stainless steel and a partially-masked witness coupon fractured from a silicon wafer were placed along the internal axis of the tubular chamber, ensuring that they made good electrical contact with the wall of the chamber. For each test sample, coupons having various surface finishes were coated including those as received, polished and sandblasted, wherein the surfaces exhibited a surface roughness (Ra) of 3.4 µm, 2.2 µm, and 7.5 µm, respectively. The tubular chamber was electrically isolated from the larger, high-vacuum chamber using vacuum compatible insulators. Further, components connected to the vacuum pumping stations were connected to an electrical ground.

A gas supply manifold, which also served as an electrode at ground potential, running along the axial length of the tubular chamber and terminating at a gas diffuser was used to introduce chemical precursors in the gas phase. The gas diffusion contained in the tubular chamber provided a distribution of process gasses (precursors), filling the interior volume of the chamber with the supplied gasses to a constant process pressure of 40 mTorr. The gas supply system included a liquid supply tank for HMDSO (bp=100.05° C., Gelest) and a separate pressurized lecture bottle with regulator for HFPO (bp=−27.4° C., Sigma). A liquid flow controller was used to regulate the flow of HMDSO at or near room temperature into a heated vaporizer/mixer (60° C.), which was immediately combined and mixed with argon gas at a controlled flow via a separate mass flow controller. This setup enabled independent control over the mixing ratios of HMDSO/Ar. HFPO was introduced downstream of the vaporizer/mixer via a heated tee connection. A separate mass flow controller was employed so that the flow and the mixing proportion of HFPO relative to HMDSO/Ar could be controlled. All external lines used in the precursor delivery system, between the vaporizer/mixer and the inlet fitting of the vacuum chamber were heated at 65° C. to prevent condensation of HMDSO. A relatively high-voltage, pulsed DC power supply was electrically connected to the tubular chamber.

In all cases, a negatively biased, pulsed voltage of −1.0 kV relative to ground was used with a pulse frequency of 500-1000 Hz and a pulse width of 20 µs. Upon forming a homogeneous plasma in the hollow space of the tubular chamber, the plasma current was limited via manual control to 40 A for Ar cleaning of test coupons before introducing the precursor gasses, and 13 A for depositing the fluoro-organosiloxane coatings. Sputter cleaning in the Ar plasma was carried out for an hour prior to coating the samples and the coating process was carried out from 6 to 20 minutes. During coating, Ar, HMDSO and HFPO were provided to the coating chamber at the process conditions noted in Table 6. Further, the pressure in the process chamber was maintained at a pressure of 40 mTorr during both cleaning and coating.

TABLE 6

Sample Process Conditions

| Process Condition | HMDSO Flow Rate (g/hr) | Ar Flow Rate (sccm) | HFPO Flow Rate (sccm) |
|---|---|---|---|
| Sample 1 | 3 | 18 | 1 |
| Sample 2 | 3 | 18 | 5 |
| Sample 3 | 3 | 18 | 18 |
| Sample 4 | 8.7 | 0 | 20 |

In all cases, well adhered coatings with relatively unique coloration were formed on both the steel and silicon substrates. The addition of the fluorinated moieties to organosiloxane is reflected in the energy dispersive X-ray analysis of the coated substrate, which is summarized in Table 7 for the various process conditions.

TABLE 7

Elemental Composition of Samples (Atomic %)

| Atomic % | C | O | F | Si |
|---|---|---|---|---|
| Sample 1 | 50.65 | 22.37 | 4.39 | 22.60 |
| Sample 2 | 45.55 | 22.83 | 15.96 | 15.67 |
| Sample 3 | 37.90 | 22.72 | 28.89 | 10.49 |
| Sample 4 | 30.65 | 20.06 | 40.73 | 8.56 |

The water contact angle in oil (WCA/O) was measured for all coated test coupons using the system described above in FIG. 4. Static WCA/O measurements were taken for a 10 µL water drop (MILLI-Q) at room temperature. Overall, a marked increase in the average WCA/O was observed for the fluoro-organosiloxane coatings as compared with organosiloxane alone. A summary of the WCA/O measurements is provided in Table 8 below.

TABLE 8

WCA/O Measurements

| Sample/Surface Finish | Min. WCA/O (deg) | Max. WCA/O (deg) | Avg. WCA/O (deg) |
|---|---|---|---|
| Sample 1/Polished | 140.0 | 151.5 | 146.8 |
| Sample 1/Sand Blasted | 140.2 | 149.2 | 144.0 |
| Sample 2/Polished | 124.1 | 140.7 | 132.7 |
| Sample 2/Sand Blasted | 145.7 | 154.2 | 150.4 |
| Sample 3/Polished | 124.1 | 146.3 | 135.1 |
| Sample 3/Sand Blasted | 140.0 | 158.6 | 152.4 |
| Sample 4/As Received | 158.6 | 164.7 | 162.0 |
| Sample 4/Sand Blasted | 158.2 | 166.0 | 163.5 |
| Sample 4/Polished | 157 | 169.1 | 163.2 |
| Avg. +/− 1 Standard Deviation | 143.1 +/− 13.3 | 155.6 +/− 9.7 | |

Figure 6:
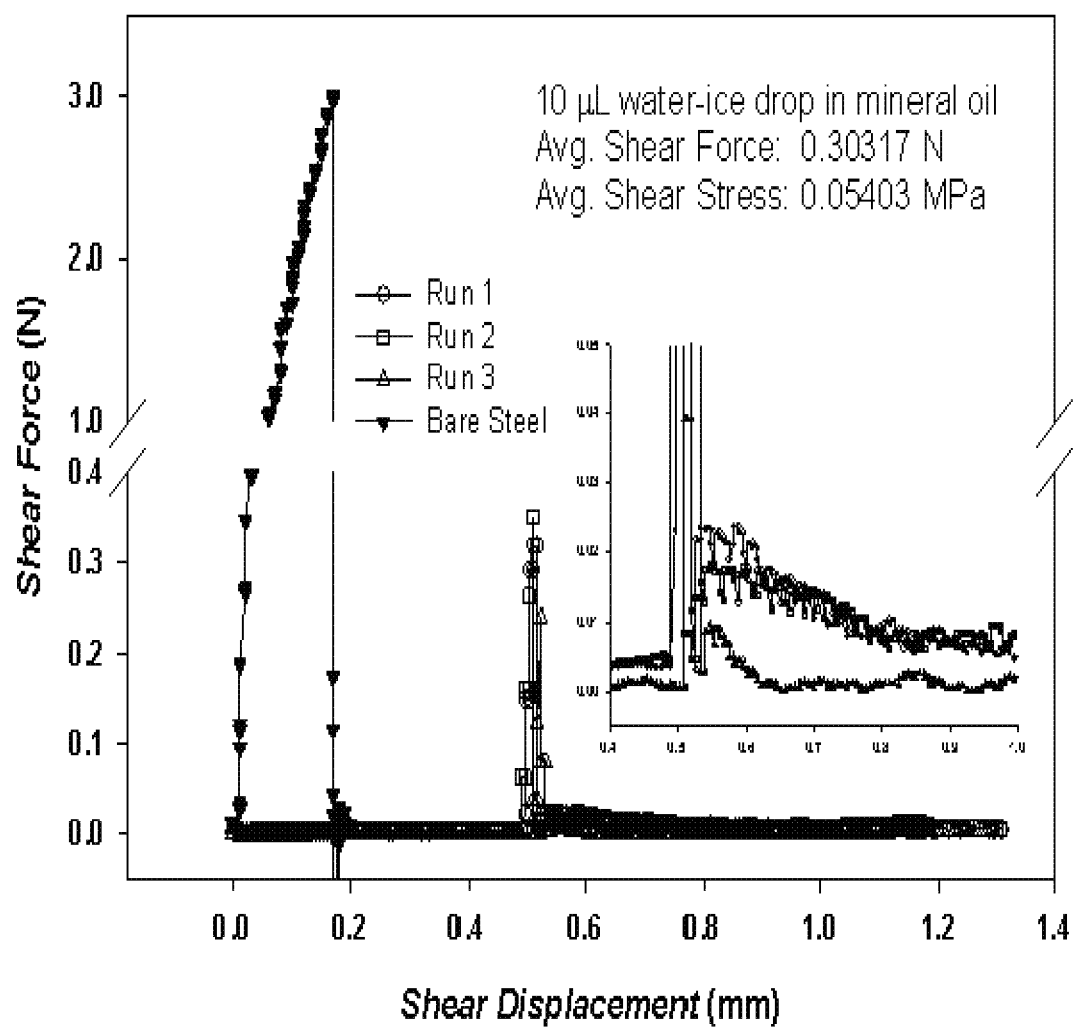
FIG. 6 illustrates a graph comparing the shear forces required to displace water droplets on Sample 4 and a bear substrate.
Figure 7:
FIG. 7 illustrates a single water ice-droplet residing on a coated test coupon in the measurement apparatus.

The shear stress required to dislodge a water-ice drop from the surface of polished Sample 4 was measured at 0.054 MPa using the methods described herein with reference to FIG. 5. As compared to a bare substrate, the measured shear stress on the coated substrate was relatively small and nearly at instrumentation resolution. FIG. 6 is a graph comparing the shear forces required to displace water droplets on Sample 4 and a bare substrate. The graph inset shows results on an expanded scale, and FIG. 7 shows a single water-ice droplet residing on a coated test coupon in the measurement apparatus. Such relatively small displacements under shear force indicate that the effective area over which water-ice exhibits binding interactions with the substrate is relatively small and such interactions do not tend to deform plastically.

Industrial Scale Laboratory Analysis

Fluoro-organosiloxane coatings were applied to tubular structures 3 feet in length and 40 feet in length, all having an internal diameter of 3.6 inches and an external diameter of 4.5 inches, utilizing the apparatus described in FIG. 2 above using the process parameters set forth in Tables 9 and 10 below. The tubular structures were formed from chromium steel alloys of including 13 atomic percent (at. %) chromium, 0.2 at % C, 0.15 at % nickel, and 0.02 at % molybdenum. The uncoated surface roughness Ra was measured to be 3.08+/−0.26 µm, wherein the Ra surface roughness is understood to be the arithmetic average of the absolute values of collected roughness data points. Before applying the coatings, an Ar plasma was generated in the tubular structures to sputter clean the substrate surfaces. The pre-cleaning process conditions for all four processes remained the same and are also outlined in Table 9 below.

TABLE 9

Process Parameters Used in Coating Deposition

| Process Parameters | Pre-Clean | Process A | Process B | Process C | Process D |
|---|---|---|---|---|---|
| Pressure (mTorr) | 40 | 40 | 40 | 17 | 32 |
| $f_{pw}$ (kHz) | 1.0 | 1.0 | 1.0 | 1.0 | 1.0 |
| $t_{pw}$ (µs) | 20 | 20 | 20 | 20 | 20 |
| $V_{pw}$ (kV) | 1.0 | 1.2 | 1.2 | 0.75 | 0.75 |
| $I_{pw}$ (A) | 90 | 15 | 15 | 18 | 12 |
| $Q_{Ar}$ (sccm) | 90 | 18 | 8.0 | 40 | 90 |
| $Q_{HMDSO}$ (g/h) | 0 | 3.0 | 3.0 | 3.0 | 6.0 |
| $Q_{HFPO}$ (sccm) | 0 | 2.4 | 2.4 | 2.4 | 4.8 |
| Deposition Time (min) | * | 30 | 30 | 120 | 60 |

* Cleaning time

A mixed-units ratio of HMDSO to HFPO (g/(h·sccm)) was preferably maintained at 1.25 throughout the coating process. The WCA/O of a liquid-water drop resting on the surface of the coated alloy steel substrate immersed in mineral oil was measured. The measured WCA/O ranged from 152° to 170.6°, with an average contact angle of 159° to 168°. Table 10 below provides the average WCA/O measurements.

TABLE 10

Measured WCA/O

| Process | Replicate Process | Tubular Structure Length (feet) | WCA/O (deg) |
|---|---|---|---|
| A | 1 | 3 | 168 +/− 0.6 |
| B | 1 | 3 | 167 +/− 3.6 |
| C | 2 | 80 ft, 2-40 ft lengths | 159 +/− 7.0 |
| D | 4 | 80 ft, 2-40 ft lengths | 161 +/− 3.0 |

Figure 8:
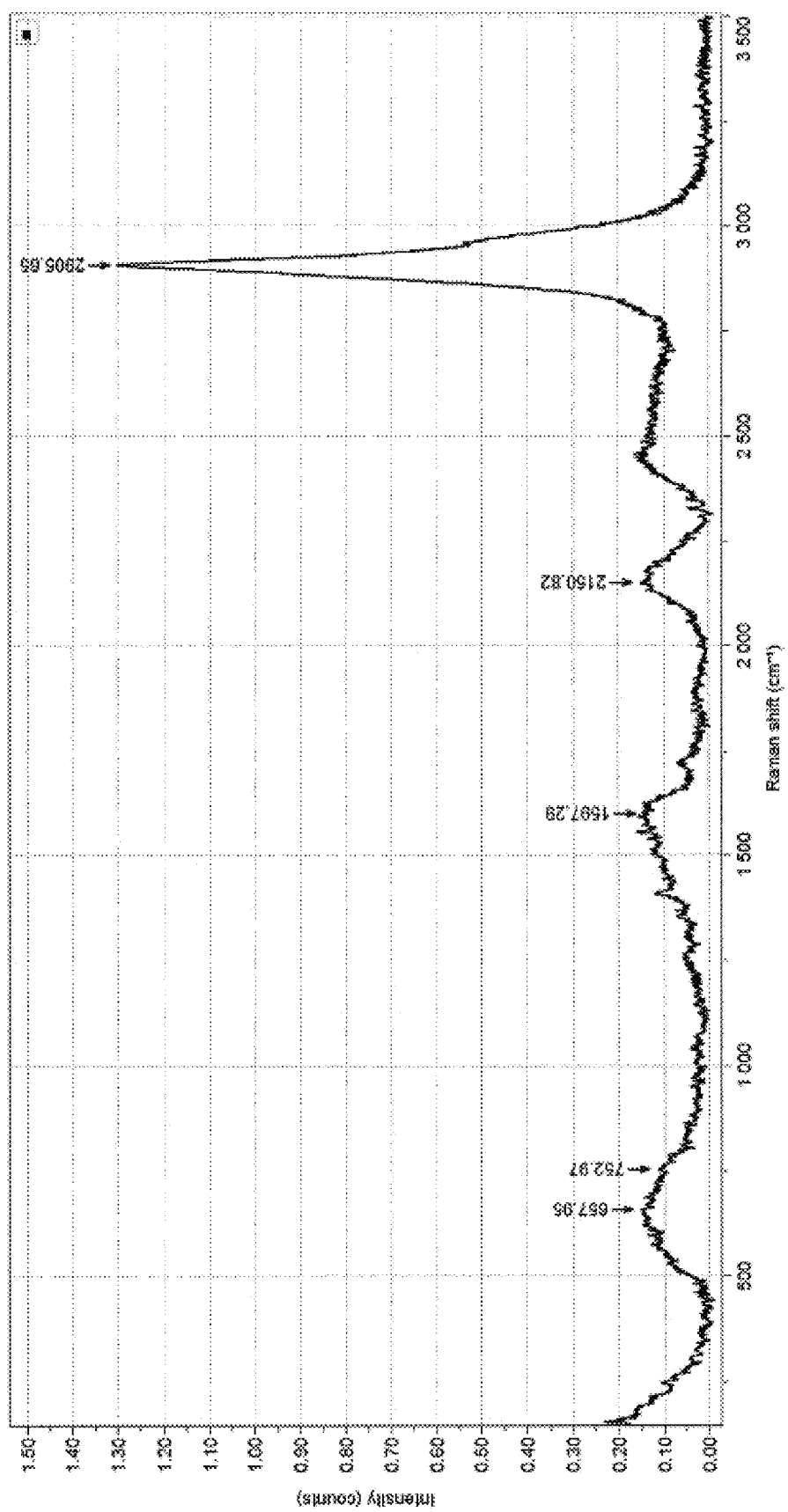
FIG. 8 illustrates a Raman spectrum of the coating developed by Process D of Tables 12 and 13, the spectrum was acquired using a laser excitation of 532 nm.

Raman spectroscopy was employed to assess the molecular and structural characteristics of the fluoro-organosiloxane coatings. Raman spectroscopy is understood to be an inelastic light-scattering technique used to interrogate the gross molecular structure and structural order of materials or substances by spectrally resolving the inelastic energy losses or gains of scattered photons as the incident photons interact and undergo momentum transfers with the molecular vibrations or lattice phonons of the material or substance. FIG. 8 illustrates the Raman spectrum of the coating developed by Process D set forth in Tables 9 and 10 above.

The relative proportion of the molecular and structural characteristics may be resolved from the spectrum illustrated in FIG. 8 and assigned to different structural groups. On the basis of spectral assignment, the process of the present disclosure is shown to yield a coating that contains both —Si—O—Si— and —$CF_x$ [x=1, 2, or 3] structural groups within the polymerized matrix of the coating composition. The occurrence of these structural features are indicated by the symmetric-Si—O—Si-stretching vibrations in a broad region of the spectrum near 500 $cm^{-1}$, along with —$CF_2$— and terminal —$CF_3$ groups appearing near 658 and 753 $cm^{-1}$, respectively.

Figure 9:
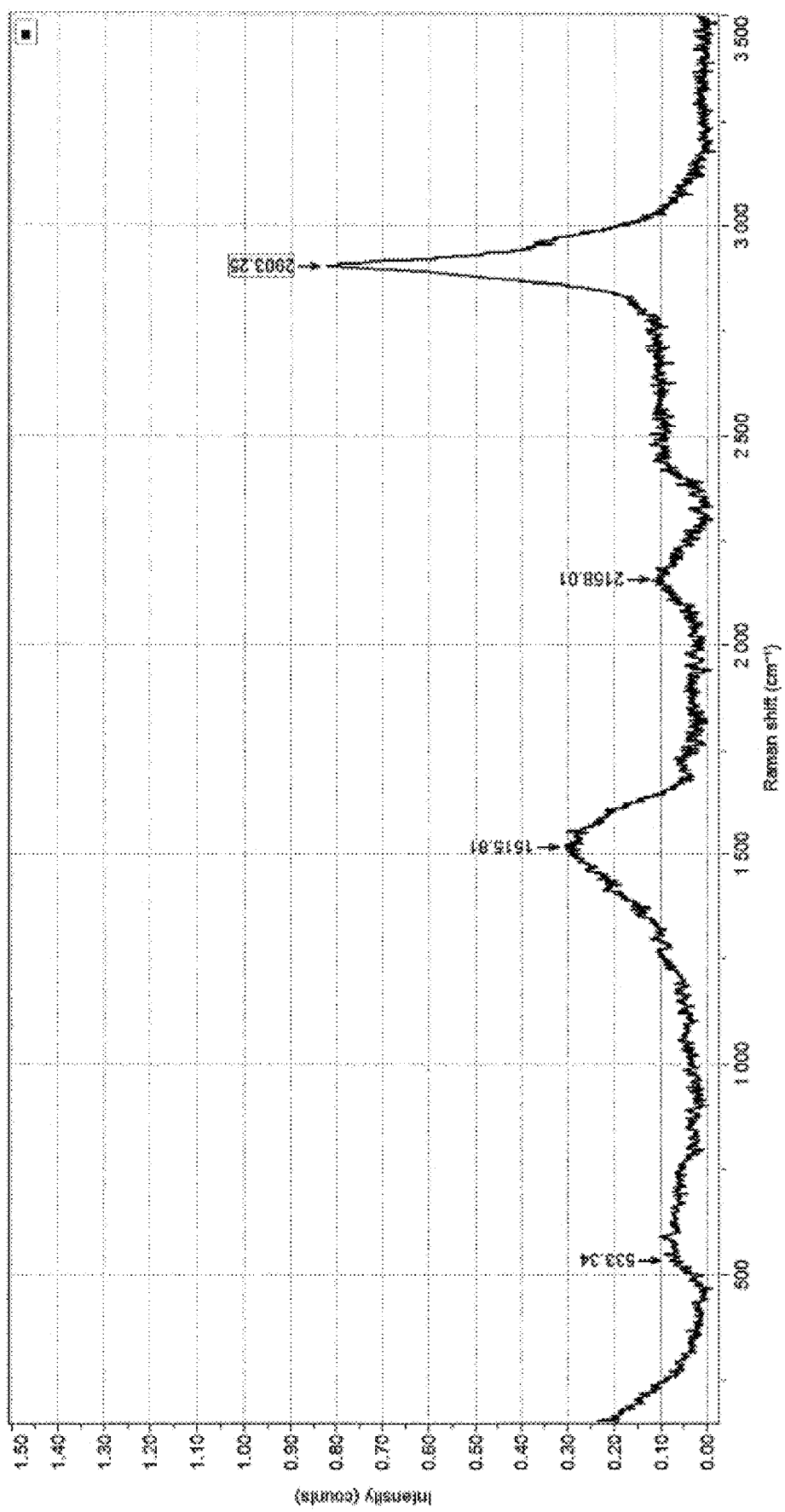
FIG. 9 illustrates a Raman spectrum of HMDSO coatings.

Comparing the Raman spectrum of the fluoro-organosiloxane coatings herein with those of organosiloxane coatings formed from HMDSO alone, using a similar pulsed DC plasma process, shown in FIG. 9, the contribution to the spectral region between 533 and 800 $cm^{-1}$ corresponding to symmetric and asymmetric —$CF_x$— [x=2, 3] stretching vibrations as well as symmetric Si—C stretching vibrations observed in the present fluoro-organosiloxane coatings are non-existent in the organosiloxane coatings. The differences in the spectral features indicate that the process described herein leads to coating compositions comprising a network of $(CA_3)$-$[CA_2]_n$-$Si(CA_3)_x$-O—Si— structural domains [n≥1; A=H, F; x=1, 2]. The terminations of some of these structural domains also are reflected in the Raman spectrum by the symmetric Si—C stretching vibrations near 700 $cm^{-1}$, which can be assigned to trifluoromethyl silane moieties, —$OSi(CF_3)_x$ or —$Si(CF_3)_x$ [x=1, 2, 3], formed as adducts in the plasma phase.

Furthermore, the relatively strong and broad contributions to the spectral region between 1200 and 1700 $cm^{-1}$ may be assigned to —C—C— and graphitic stretching modes, as well as —$CH_2$-scissoring modes associated with the formation of substantially amorphous domains of carbon and carbosilanes [Si—$CH_2$—Si] in the fluoro-organosiloxane coating. These modes are also reflected in the —C—H stretching modes occurring near the 2900 $cm^{-1}$ region of the fluoro-organosiloxane spectrum.

The composition of matter of the fluoro-organosiloxane coating of the present disclosure appears to be only accessible through the unique combination of the characteristics parameters for electrically stimulating the plasma, the molar ratio of chemical precursors employed, and the formation of adduct species in the plasma phase. This combination, in turn, appears to provide the superhydrophobicity and relatively low surface-adhesion properties that inhibit nucleation, growth and adhesion of gas hydrates and the adhesion of asphaltenes, waxes, and inorganic scales on substrates, such as the tubular structures and steel substrates utilized in oil and gas pipelines. Moreover, the process appears to be amendable to coating the internal surface of relatively long tubular structures, such as tubular structures exhibiting a L:D ratio of 48:1 or greater, wherein D is the inner diameter of the structure, including all values and ranges therein from 48:1 to 150 to 1. The process may be used to apply the fluoro-organosiloxane coatings in non-tubular substrates and on non-tubular components in a vacuum chamber.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A process for the deposition of a fluoro-organosiloxane coating, comprising:
   providing a process chamber including one or more tubular substrates and an electrode positioned in said tubular substrate;
   reducing pressure in said process chamber to a first pressure in the range of 10 mTorr to 40 mTorr;
   introducing hexamethyldisiloxane (HMDS) precursor at a flow rate in grams per hour (g/hr);
   introducing hexafluoropropylene oxide (HFPO) precursor at a flow rate in standard cubic centimeters per minute (sccm);
   setting a flow rate ratio of HMDS to HFPO at 1.25 (g/(hr-sccm));
   applying a pulsed DC voltage to said tubular substrate; and
   depositing a fluoro-organosiloxane coating on said tubular substrate wherein said fluoro-organosiloxane coating exhibits an average water contact angle in oil (WCA/O) of 159° to 168°.

2. The process of claim 1 wherein said coating requires less than 0.06 MPa of shear pressure to dislodge a water-ice droplet adhered to a surface of said coating.

3. The process of claim 1 wherein said coating includes one or more of the following amorphous domains: —Si—O—Si—, —Si(CF$_3$)$_x$, —Si(CHF$_2$)$_x$, —Si—[CF$_2$]$_n$—Si—, and —Si—(CH$_2$)$_n$—Si—, (CA$_3$)-[CA$_2$]$_n$—Si(CA$_3$)$_y$-O—Si— wherein x=1, 2, 3; A=H or F; y=1,2; n≥1.

4. The process of claim 1 wherein the pulsed DC voltage is applied at a pulse width frequency of 1.0 kHz, a pulse width duration of 20 μs, a pulse width voltage of 1.2 or 0.75 kV, and a pulse width current of 12, 15 or 18 amps.

5. A process for the deposition of a fluoro-organosiloxane coating, comprising:

providing a process chamber including one or more substrates to be coated within said process chamber where said substrate is the anode or cathode of an electrical circuit;

reducing pressure in said process chamber to a first pressure in the range of 10 mTorr to 40 mTorr;

introducing hexamethyldisiloxane (HMDS) precursor at a flow rate in grams per hour (g/hr);

introducing hexafluoropropylene oxide (HFPO) precursor at a flow rate in standard cubic centimeters per minute (sccm);

setting a flow rate ratio of HMDS to HFPO at 1.25 (g/(hr-sccm));

providing a second electrode to complete said circuit and applying a pulsed DC voltage to said substrate; and depositing a fluoro-organosiloxane coating on said substrate wherein said fluoro-organosiloxane coating exhibits an average water contact angle in oil (WCA/O) of 159° to 168°.

6. The process of claim 5 wherein said coating requires less than 0.06 MPa of shear pressure to dislodge a water-ice droplet adhered to a surface of said coating.

7. The process of claim 5 wherein said coating includes one or more of the following amorphous domains: —Si—O—Si—, —Si(CF$_3$)$_x$, —Si(CHF$_2$)$_x$, —Si—[CF$_2$]$_n$—Si—, and —Si—(CH$_2$)$_n$—Si—, (CA$_3$)-[CA$_2$]$_n$—Si(CA$_3$)$_y$-O—Si— wherein x=1, 2, 3; A=H or F; y=1,2; n≥1.

8. The process of claim 5 wherein the pulsed DC voltage is applied at a pulse width frequency of 1.0 kHz, a pulse width duration of 20 μs, a pulse width voltage of 1.2 or 0.75 kV, and a pulse width current of 12, 15 or 18 amps.

* * * * *